United States Patent [19]

Sosa et al.

[11] Patent Number: 5,527,511
[45] Date of Patent: Jun. 18, 1996

[54] APPARATUS AND PROCESSES FOR REDUCING UNDESIRABLE VOLATILES IN RECYCLE STREAMS OF MONOVINYL AROMATIC POLYMERIZATION SYSTEMS

[75] Inventors: Jose M. Sosa, Deer Park; Stan Beisert, Houston, both of Tex.

[73] Assignee: Fina Technology, Inc., Dallas, Tex.

[21] Appl. No.: 653,528

[22] Filed: Feb. 11, 1991

[51] Int. Cl.[6] .................................................. C08F 2/02
[52] U.S. Cl. .................................... 422/131; 422/132
[58] Field of Search ................................... 526/67

[56] References Cited

U.S. PATENT DOCUMENTS 3,859,268  1/1975  Novack et al. .................... 526/67
4,408,024  10/1983  Matsuyama et al. .................... 526/68

Primary Examiner—Thomas R. Weber
Attorney, Agent, or Firm—Michael J. Caddell; M. Norwood Cheairs

[57] ABSTRACT

Methods and apparatus are disclosed for removing undesirable volatile components having high boiling points from a product stream during polymerization of monovinyl aromatic compounds such as styrene, which methods include the use of heat exchangers, devolatilizers, and filter beds.

3 Claims, 1 Drawing Sheet

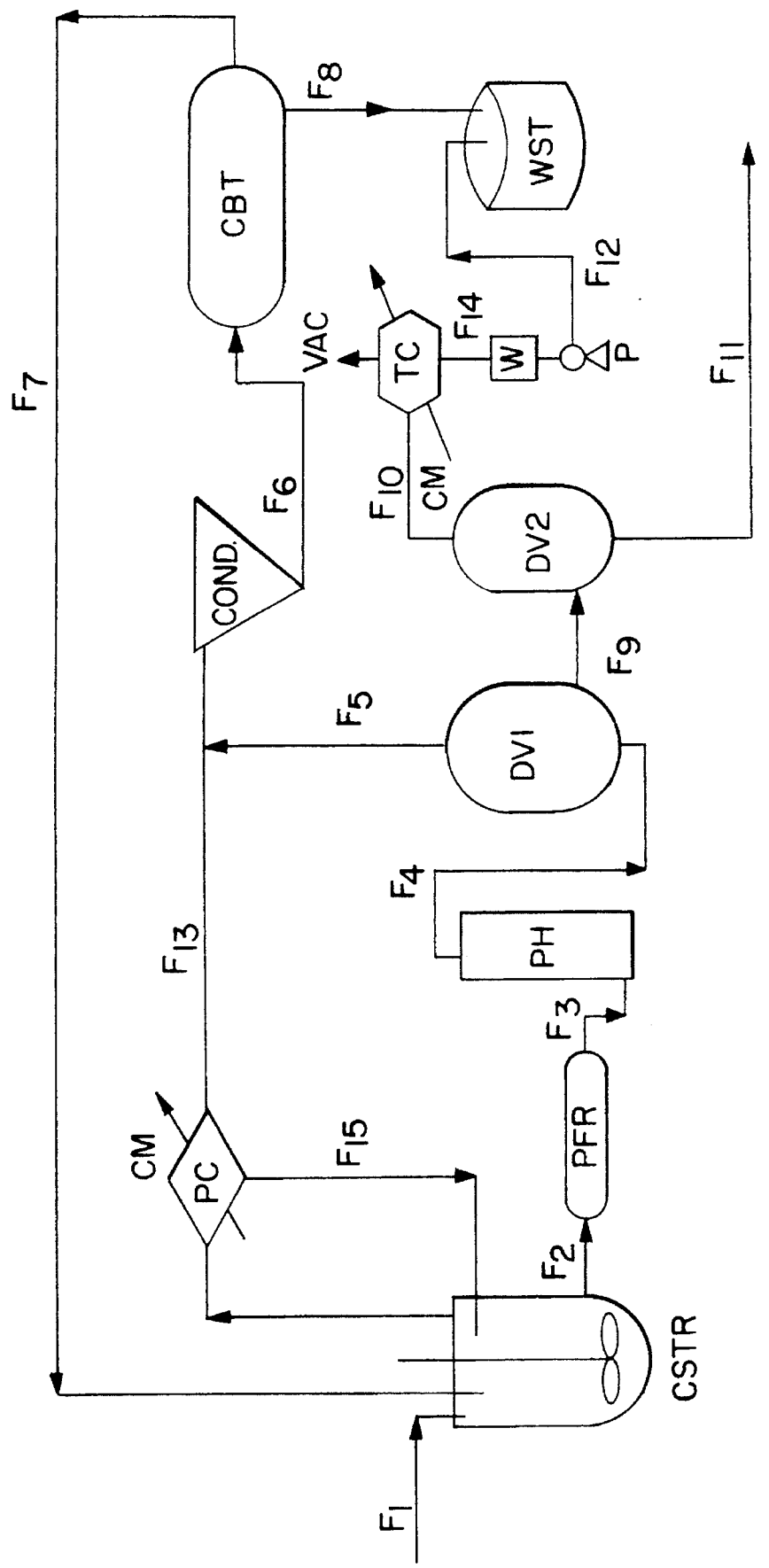

5,527,511

APPARATUS AND PROCESSES FOR REDUCING UNDESIRABLE VOLATILES IN RECYCLE STREAMS OF MONOVINYL AROMATIC POLYMERIZATION SYSTEMS

FIELD OF THE INVENTION

This invention relates to processes and apparatus for polymerizing monomers such as monovinyl aromatic compounds, including styrenes, alpha-methyl styrenes, and ring-substituted styrenes; and more particularly involves methods and apparatus for removing acid species and other undesirable compounds from the recycle subsystems in polymerization systems.

BACKGROUND OF THE INVENTION

In the field of polymers, one of the most widely manufactured classes of polymers is that encompassing polymerized monovinyl aromatic compounds such as styrenes, alpha-methyl styrenes, and ring-substituted styrenes. Of this class, the most common members are normal polystyrene, and rubber-modified polystyrene—often called high impact polystyrene or HIPS.

In the continuous process of polymerizing styrene monomer into polystyrene and HIPS, a common process of carrying out the polymerization is through the use of polymerization initiators such as t-butyl peroxybenzoate and dibenzyl peroxide. One disadvantage of using such initiators is that a by-product of the polymerization process using these initiators is acid decomposition by-products, such as benzoic acid, which acidic species then react with the initiator and, as a consequence, inhibit further polymerization, when recycled with unreacted monomer back into the polymerization reactors.

One method of handling this problem is that disclosed in Sosa, et al U.S. Pat. No. 4,857,587, the entire disclosure of which is hereby incorporated by reference into this application. In the Sosa patent, recycled unreacted monomer is passed through a recycle treatment vessel to remove acidic species. The vessel would normally contain an adsorbent material such as alumina or clay to remove a major portion of the acid component from the recycle stream.

Other methods of reducing the effect of acid decomposition by-products are disclosed in the two Sosa et al patents, U.S. Pat. Nos. 4,777,210 and 4,861,827, the disclosures of which are hereby incorporated by reference herein. The '210 patent discloses a preinversion reactor to control particle size and the '827 patent teaches the use of initiators which do not decompose into acid by-products during the polymerization process.

The present invention provides an advancement over the known methods of minimizing acid decomposition by-products, which advancement can also be used in conjunction with the above-described patented methods to even further reduce unwanted by-products.

SUMMARY OF THE INVENTION

The present invention comprises methods and apparatus for reducing acidic decomposition by-products in the recycle stream of polystyrene and modified polystyrene polymerization systems which methods and apparatus utilize a second devolatilizer in the process stream to concentrate the removal of unwanted acidic decomposition by-products, and a partial condenser in the recycle overhead line on the reactor vessel.

BRIEF DESCRIPTION OF THE DRAWING

The figure is a schematic flow diagram illustrating the present invention in place in a typical high-impact polystyrene polymerization plant.

DESCRIPTION OF THE PREFERRED EMBODIMENTS

Referring now to the figure, there is illustrated therein a schematic representation of a series of reaction vessels and associated apparatus useful in the practice of styrene polymerization and more particularly in the production of rubber-modified styrene using the process of the present invention.

In the manufacture of HIPS material using this process, styrene, polybutadiene, a free-radical initiator, and additional components such as solvents, anti-oxidants, and other additives are usually fed to a polymerization reactor indicated at CSTR through a feed line or multiple feed lines generally indicated at F1. The polymerization reactor CSTR is of the type commonly referred to as a continuous stirred tank reactor. As used herein, the term "styrene" includes a variety of substituted styrenes, e.g. alpha-methylstyrene, ring-substituted styrenes, such as p-methylstyrene and p-chlorostyrene, as well as unsubstituted styrene. Typically, the mixture in polymerization reactor CSTR will comprise about 75 to 99% by weight styrene, about 1 to 15% by weight polybutadiene, about 0.001 to 0.2% by weight free-radical initiator, and about 0.1 to about 6% by weight additional components.

The reactor CSTR, as previously mentioned, is a continuously stirred tank reactor which operates at a percent solids level above the inversion of the polymer system. That is, the polymerization reactor operates at a percent solids level such that the system has a continuous phase of polystyrene and a discontinuous phase of dispersed droplets of rubber; or preferably, the droplets are a mixture of polystyrene and rubber.

The CSTR reactor is sometimes also referred to as a "boiling reactor" which means that the styrene/polystyrene/rubber mixture therein is allowed to "boil" by vaporization of the lighter components (styrene monomer, ethylbenzene, for example). This vaporizing of lighter compounds serves to remove a large amount of the heat of polymerization, and allows the operator to better control the rate of polymerization in the CSTR vessel.

The vapor components from the CSTR reactor are drawn off of the vessel and piped via line F13 to the main condenser as described hereinbelow, there to be condensed for return to the reactor via the recycle stream.

In this preferred embodiment, the vaporized volatiles from the reactor CSTR, which comprise desirable lower boiling point volatiles such as unreacted monomer and ethylbenzene for example, and undesirable volatiles such as acid species and other higher boiling point volatiles, are drawn off of the upper part of the CSTR reactor to allow the heat of polymerization to be controlled by removing it in the form of these vaporized volatiles. In conventional polymerization systems these total volatiles would be piped to the main condenser COND for condensation and then filtration in a filter system CBT for removal of the undesirables. The filtered condensate would then be recycled back into the reactor system.

In the present embodiment, it has been found that the total burden on the condenser COND and the filter system CBT can be reduced substantially by inserting a partial condenser PC in the vapor line F13, which partial condenser is operated at conditions which condense primarily only desirable volatiles such as unreacted monomer and ethylbenzene. These condensed volatiles, are returned directly from the partial condenser PC to the reactor CSTR via return line F15. The remaining uncondensed volatiles, such as nitrogen and water vapor and other lower boiling point compounds, are transported from the partial condenser PC to the main condenser COND for condensation and removal of undesirable compounds before adding them to the normal recycle stream.

Preferably, the apparatus used in practicing the present invention may additionally comprise a second polymerization reactor of the continuous stirred tank reactor type which is operated at a preinversion condition, ie the continuous phase therein is a styrene-rubber solution and the discontinuous phase is polystyrene. The preinversion reactor (not shown) is usually located directly ahead of, or upstream of, the polymerization reactor CSTR such that the styrene, polybutadiene, free-radical initiator, and other components are fed to the preinversion reactor first and the mixture exiting the preinversion reactor is then fed to the CSTR reactor. The preinversion reactor is also preferably a continuous stirred tank reactor.

The liquids/solids output from the polymerization reactor CSTR is fed to another polymerization reactor through flow line F2 where post-inversion stage polymerization occurs. Preferably this next polymerization reactor is a linear-flow reactor, such as a plug flow reactor, but may also be a tower-type reactor or other known reactor configuration. The figure indicates a single linear-flow reactor PFR, whereas more than one linear-flow reactor may be utilized, placed in serial connection with the PFR reactor. This achieves increased polymerization in each subsequent horizontal reactor. The output from the plug flow horizontal polymerization reactors is at a temperature of around 340° F. and is directed to a preheater PH and from there to a conventional devolatilizer DV1 through flow lines F3 and F4, respectively. The temperature of the material leaving the preheater is preferably in the range of about 480° F. Unreacted styrene monomer and other volatile residual components leave devolatilizer DV1 through overhead line F5 as a recycle stream component. This recycle stream is preferably returned to the present system after condensation in condenser COND and further treatment in clay bed treater CBT via flow line F6. The treated recycled stream then flows through flow line F7 back to the polymerization reactor CSTR. Periodically the absorbent material, whether it be clay or alumina, or other suitable material, in the treater CBT is backflushed and regenerated, with the waste material being transported via flow line F8 to waste storage tank WST.

Referring back to the output of devolitilizer DV1, in addition to the overhead recycle stream containing the aforementioned volatile components flowing through F5, the polymerization reactants, at about 99.5% solids and comprising polymerized high impact polystyrene and nonvolatile components at a temperature of about 440° F., flow out the lower end of DV1 through flow line F9 to a second devolatilizer DV2. In devolatilizer DV2 additional volatile components are separated and flowed out through line F10, and finished polystyrene or high impact polystyrene moves through product line F11 at a temperature of about 440° F. to a pelletizer or other type of finished product formulation unit.

The devolatilizer DV1 and DV2 preferably have conventional heating elements, such as external heater coils, arranged to maintain the reactant stream therein at a relatively constant temperature in the range of about 440° F.

The devolatilizers use a combination of the heat already in the material, heat added by the heater coils, and a vacuum in the range of about 1 to 10 mm Hg to vaporize or "boil-off" the volatiles in the stream. Preferably the first devol unit DV1 maintains a low pressure (vacuum) of around 5–10 mm Hg and the second devol a lower pressure (higher vacuum), in the range of only about 1 mm Hg.

This higher pressure (lower vacuum) in DV1 then preferentially vaporizes the desirable lower boiling point volatiles such as styrene monomer, ethylbenzene, and other aromatics and vinyl structures. On the other hand, the greater vacuum in DV2 allows the undesirable, higher boiling point volatiles to be boiled off therein, such as the oxygenated species, acids, quinones, phenols, etc.

The volatile components from DV2 flowing through line F10 are then passed through a total condenser TC which totally condenses these volatile components by means of a cooling medium CM flowing thereacross, and these condensed components are then flowed through waste line F14 to waste sump W. A pump P then pumps the waste components through line F12 to the waste storage tank WST.

The recycle streams coming off of the devolatilizers DV1 and DV2 contain a variety of impurities. The major impurities in these streams can be traced to products of reactions between species necessarily present in the recycle stream, such as styrene monomer and anti-oxidant, impurities from the rubber, and unwanted species in the systems, such as oxygen. Although some of the recycle stream impurities are innocuous, it has been unexpectedly discovered that certain impurities in the recycle stream adversely affect the polymerization process and/or the resultant HIPS product when the recycle stream is introduced back into the system.

In the continuous process of the present invention, polymerization of the styrene monomer is initiated by the decomposition of a free-radical initiator. Initiating radicals for the polymerization reaction are generated by the decomposition of the free-radical initiator into one or more primary radicals. The primary radical then reacts with styrene monomer to initiate polymerization.

Typically, the free-radical initiator is fed to the first polymerization reactor CSTR which is maintained at conditions under which the free-radical initiator decomposes, although it may also be provided to the aforementioned preinversion reactor ahead of the CSTR reactor or it may be introduced at the linear flow reactor PFR. The free-radical initiator may alternatively be selected such that it will not decompose in the first polymerization reactor and rather will decompose under the conditions maintained in some subsequent polymerization reactor such as the PFR or subsequent linear flow reactor. In this case, polymerization of styrene monomer in polymerization reactors can be thermally initiated. Alternatively, a combination or two or more free-radical initiators can be used, such that one free-radical initiator decomposes in the polymerization reactor CSTR and another free-radical initiator decomposes in the linear flow reactor PFR.

Decomposition of the free-radical initiator, which initiates polymerization of the styrene monomer, also produces decomposition by-products which do not participate in the polymerization reaction. In the present continuous flow process, these decomposition by-products of the free-radical initiator are removed from the HIPS polymer in the devolatilizers DV1 and DV2 and, unless removed from the recycle stream, would be reintroduced into the polymerization reactors.

Investigation of the effects of various recycle stream components upon styrene polymerization has shown that acid decomposition by-products of free-radical initiators react with such initiators, thereby inhibiting styrene polymerization. It is believed that these acidic decomposition by-products adversely affect free-radical initiator efficiency by inducing decomposition of the free-radical initiator and/ or trapping free-radicals produced by spontaneous (as opposed to induced) decomposition of the free-radical initiator. Thus, the acidic decomposition by-products decrease the number of free-radicals available to initiate polymerization of the styrene monomer, which in turn decreases the efficiency of the free-radical initiator.

Benzoic acid is one example of an acid decomposition by-product having such an adverse effect. The realization that benzoic acid in the recycle stream inhibits styrene polymerization in the presence of free-radical initiators is particularly significant since benzoic acid is a decomposition by-product of t-butyl peroxybenzoate and dibenzyl peroxide, two of the most commonly used free-radical initiators in the continuous process production of HIPS. Benzoic acid is also produced from the air oxidation of benzylaldehyde, which in turn is produced from the oxidation of styrene. Other acidic species may be present in the polybutadiene rubber. It is well known that phenolic anti-oxidants, sulphur components, and substituted phosphites are added to protect the rubber from oxidation. The aforementioned incorporated patent U.S. Pat. No. 4,857,587 lists several acid-producing free-radical initiators and their corresponding acid decomposition by-products. Also shown therein is a graphical illustration of the detrimental effects of benzoic acid on styrene polymerization when using the free-radical initiator t-butyl peroxybenzoate.

According to the process of the aforementioned incorporated '587 patent, the adverse effects of acid decomposition by-products of free-radical initiators are avoided by directing the recycle stream through a recycle treatment vessel CBT interposed between the devolatilizer DV1 and the recycle stream return line F7. The recycle treatment vessel CBT, preferably comprises at least one adsorbent material, such as alumina or clay, which is capable of removing acid components from the recycle stream. Other examples of specific adsorbent materials include alumina, attapulgus clay, carbon, silica gels, and Porocel (trademark for an alumina). The size and shape of the recycle treatment vessel is determined according to standard engineering practices. Preferably the CBT is a clay-filled tower, maintained at approximately 80° to 120° C. and about 20 to 25 psi pressure.

While the recycle treatment vessel CBT must be capable of removing substantially all of the acid components from the recycle stream, it is highly desirable that the adsorbent used also be capable of removing other impurities, both identified and unknown, from the recycle stream. The combined effects of all impurities, including acid decomposition by-products, upon styrene polymerization reaction rate and the average rubber particle size in the resultant HIPS polymer are significantly detrimental, and increase with an increase of the amount of impurities.

In addition to the removal of some of the acid by-products species from the volatile line off of devolatilizer DV1, it has further been found that by proper selection of vacuum levels in the devolatilizers, a larger percentage of the undesirable products can be made to pass out through product line F9 from DV1 and into the second devolatilizer DV2 where those undesirable volatile components can be removed from the polymerized material thereby preventing overburdening of the clay bed treater while obtaining a further protection of the initial free-radical initiators.

In the present invention, the major portion (approximately 80%) of the volatile components leading from the preheater PH are removed in devolatilizer DV1 and passed through flow line F5. Approximately 20% of the removable volatiles are then removed from the polymer stream in devolatilizer DV2. Originally the volatile components from DV2 were added back into the recycle stream F5 through flow line F10. It has been found however that a major portion of the undesirable acidic by-products are removed in the volatiles of DV2 rather than DV1. More than 80% of the total volatiles are removed in DV1 and added to the recycle stream and less than 20% of the total volatiles are removed from DV2, yet the low volatile output of DV2 comprises a major portion of the acidic by-products which destroy the free-radical initiators. Therefore, it was found that rather than adding the output of devolatilizer DV2 back into the recycle stream, the clay bed treatment vessel life can be extended significantly by routing the volatiles from DV2 into a total condenser TC through flow line F10, totally condensing all of the volatiles, and removing them to a waste sump W whereupon they are pumped by pump P to the waste storage tank WST.

Thus, the loss of less than 20% of the volatiles from the recycle stream results in removal of more than half of the undesirable acid decomposition by-products from the recycle stream, which greatly extends the life of the adsorbent material in the treatment vessel CBT.

The present invention comprises a process, and apparatus for performing the process, for manufacturing polymerized styrenics, which process includes the steps of utilizing a composition of devolatilizers and a partial condenser to remove volatile components from the polymerized styrene material and filtering the volatile components to remove destructive acid by-products. The process further encompasses a second devolatilizer downstream of a first devolatilizer for selectively removing undesirable volatile components from the finished polystyrene and, instead of recycling these undesirable volatile components, condensing them in a total condenser and pumping them to a waste storage tank. The removal of all of the volatile components from the second devolatilizer results in a loss of less than 20% of the total volatiles but also results in removal of more than half of the destructive acid by-product components and a resulting decrease in the burden on the filter treatment vessel CBT. An additional decrease in the burden on the condenser and filter system is achieved using a partial condenser in the reactor vessel vapor recycle stream.

Although the invention has been described with reference to particular embodiments thereof, it will be apparent to those skilled in the art that various changes and modification can be made without departing from the spirit of the invention or from the scope of the appended claims.

The embodiments of the invention in which an exclusive property or privilege is claimed are defined as follows:

1. Apparatus for purifying monovinyl aromatic streams in a polymerization process, said apparatus comprising:

a monovinyl aromatic polymerization reactor system adapted to polymerize monomeric monovinyl aromatic feedstock;

a vapor line coming off of said reactor system for bleeding off vaporized volatiles in said reactor system and for removing heat of polymerization from said reactor system;

a partial condenser in said vapor line adapted to condense and return to said reactor system primarily desirable volatiles from said reactor system, and further adapted to allow lower boiling point volatiles to pass therethrough uncondensed;

a condenser arranged to receive and condense said vaporized volatiles from said vapor line;

a filter system arranged to receive said condensed volatiles and further arranged to filter undesirable compounds from said condensed volatiles;

a recycle line leading from said filter, communicating filtered condensate back to said reactor system; and, a devolatilizer system arranged to receive the monovinyl aromatic stream from said reactor system and adapted to vaporize volatiles from said stream and communicate said vaporized volatiles to said condenser.

2. A monovinyl aromatic polymerization system comprising:

a reactor assembly arranged to polymerize monovinyl aromatic monomer;

a vapor removal system on said reactor assembly for controlling the rate of polymerization in said reactor assembly by removing the heat of polymerization via vaporized volatiles therein, said vapor removal system further comprising a partial condenser and a condensate return line to said reactor assembly;

a filter arranged to filter undesirable volatiles from said condensed volatiles and return said condensed volatiles to said reactor assembly;

a devolatilizer system communicating with said reactor assembly, arranged to receive the product stream therefrom, and adapted to vaporize volatiles from said product stream; and, a vapor line leading from said devolatilizer system to said condenser assembly for transferring vaporized volatiles thereto.

3. The polymerization system of claim 2 wherein said partial condenser is adapted to condense primarily only lower boiling point volatiles, including unreacted monomer and ethylbenzene.

* * * * *